(12) United States Patent  (10) Patent No.: US 7,391,303 B2
Ball  (45) Date of Patent: Jun. 24, 2008

(54) OBJECT ALIGNMENT DEVICE AND METHOD

(76) Inventor: Randell D. Ball, 903 N. Beglis Pkwy., Sulphur, LA (US) 70663

( * ) Notice: Subject to any disclaimer, the term of this patent is extended or adjusted under 35 U.S.C. 154(b) by 305 days.

(21) Appl. No.: 11/015,244

(22) Filed: Dec. 16, 2004

(65) Prior Publication Data

US 2007/0159310 A1 Jul. 12, 2007

(51) Int. Cl.
G08B 21/00 (2006.01)
(52) U.S. Cl. ............... 340/431; 340/436; 340/686.2; 340/556; 280/477; 280/DIG. 14
(58) Field of Classification Search ............ 340/431, 340/435, 436, 686.2, 687, 691.6, 693.5, 555, 340/556, 557, 686.1; 280/477, DIG. 14, 280/491.1; 33/286; 250/491.1
See application file for complete search history.

(56) References Cited

U.S. PATENT DOCUMENTS

| | | | |
|---|---|---|---|
| 3,966,231 A | | 6/1976 | Metzler |
| 4,313,264 A | * | 2/1982 | Miller, Sr. ............... 33/264 |
| 5,745,050 A | * | 4/1998 | Nakagawa ............ 340/903 |
| 5,927,229 A | * | 7/1999 | Karr, Jr. ............... 116/28 R |
| 5,951,035 A | | 9/1999 | Phillips, Jr. et al. |
| 6,018,879 A | | 2/2000 | Carder |
| 6,120,052 A | | 9/2000 | Capik et al. |
| 6,150,938 A | * | 11/2000 | Sower et al. ............ 340/557 |
| 6,176,505 B1 | | 1/2001 | Capik et al. |
| 6,178,650 B1 | | 1/2001 | Thibodeaux |
| 6,222,457 B1 | * | 4/2001 | Mills et al. ............ 340/686.1 |
| 6,252,497 B1 | | 6/2001 | Dupay et al. |
| 6,386,572 B1 | | 5/2002 | Cofer |
| 6,539,886 B2 | | 4/2003 | Henry et al. |
| 6,585,281 B1 | | 7/2003 | Voorting |
| 6,713,750 B2 | | 3/2004 | Goddard |
| 6,765,607 B2 | | 7/2004 | Mizusawa et al. |
| 2002/0056971 A1 | | 5/2002 | Grasso et al. |
| 2002/0070529 A1 | | 6/2002 | Dravecz |
| 2003/0178809 A1 | | 9/2003 | Anderson |

FOREIGN PATENT DOCUMENTS

| | | |
|---|---|---|
| DE | 102 24 939 A1 | 1/2004 |
| EP | 0 921 056 A2 | 6/1999 |
| EP | 0 921 056 A3 | 9/2001 |
| GB | 2 309 789 A | 8/1997 |

* cited by examiner

Primary Examiner—Anh V La
(74) Attorney, Agent, or Firm—McAfee & Taft

(57) ABSTRACT

An object positioning device and method for positioning an object in a desired position relative to another object. In one aspect, the invention provides a device for aligning hitching components used in coupling a trailer to a towing vehicle. The invention also provides an apparatus for positioning an object upheld by a-base over a supporting surface, comprising a plurality of independently adjustable plumb devices associated with the base. This object positioning apparatus is beneficial in adjusting the verticality of a target supported over the coupling on a trailer used in the trailer hitch alignment device of the present invention.

51 Claims, 12 Drawing Sheets

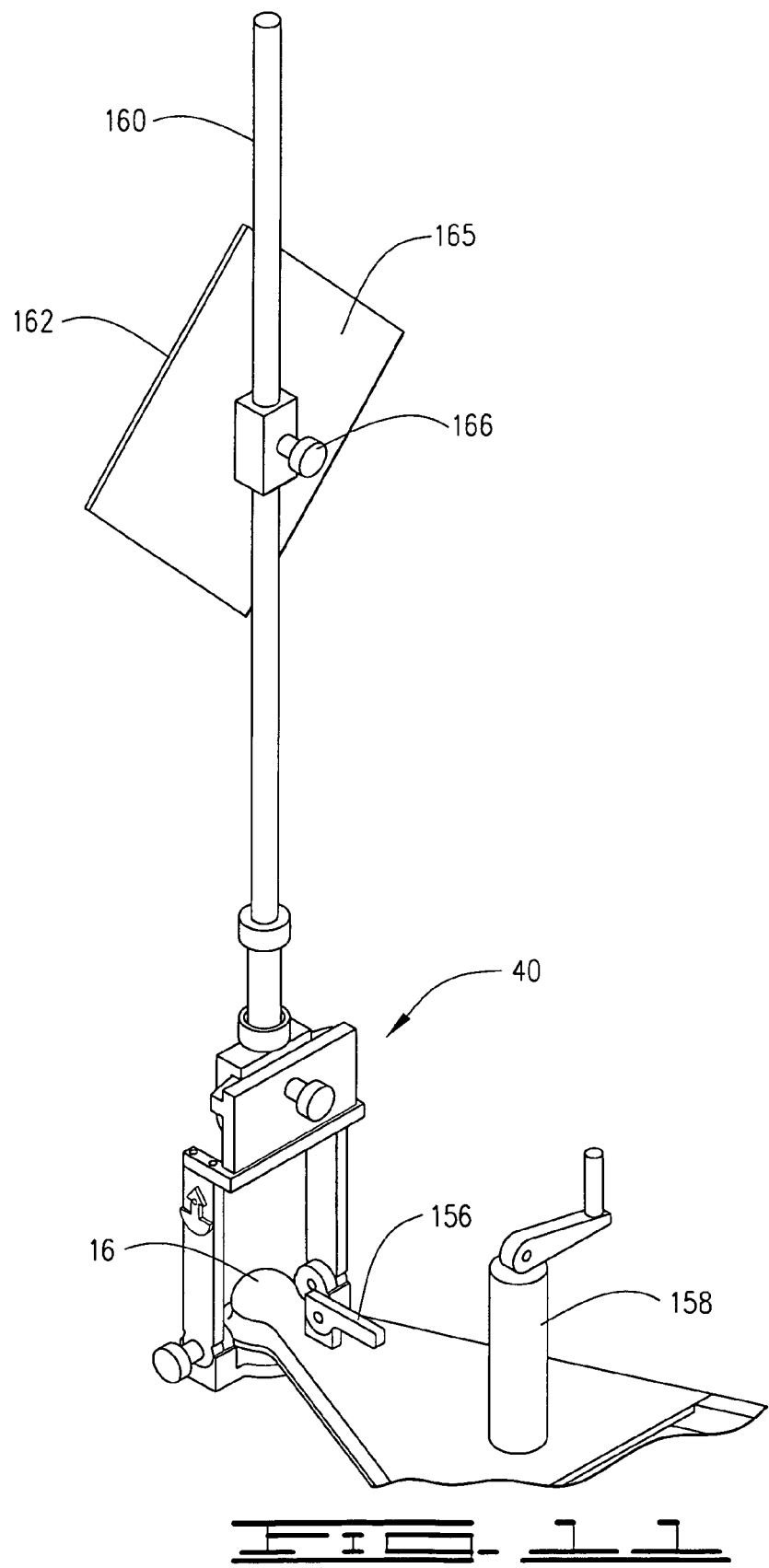

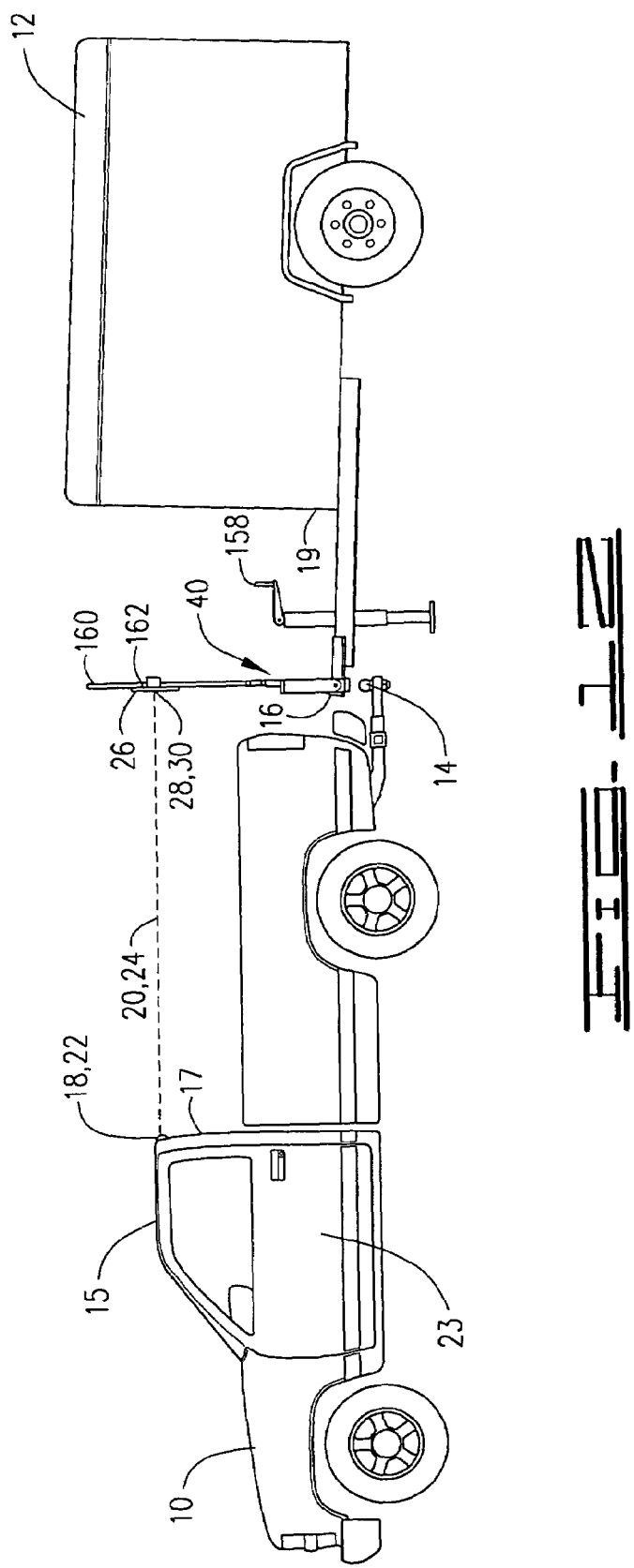

OBJECT ALIGNMENT DEVICE AND METHOD

BACKGROUND OF THE INVENTION

I. Field of the Invention

This invention relates generally to object positioning aids, and in particular to an optically guided system for aligning hitching components used in coupling a trailer to a towing vehicle.

II. Description of the Prior Art

Maneuvering a towing vehicle into position for coupling with a trailer can be a difficult and time consuming endeavor. This task typically requires the driver of the towing vehicle to estimate the distance between the hitching components. Often, the driver must repeatedly leave the towing vehicle to gauge the orientation of the hitch relative to the coupling unit on the trailer. Even with another person's assistance, this exercise can be a frustrating and divisive chore. In either case, success usually is achieved by trial and error. Even worse, failed attempts to successfully align the hitching components can cause damage to trunks, tailgates and plastic bumpers.

Numerous trailer hitching guides are known in the art. Examples range from alignment guides of telescoping rods to systems comprising proximity sensors with LED displays. Many of the simpler, less expensive devices can be inaccurate or easily compromised by inclement weather. More complex systems can be costly and cumbersome. Few, if any, are universally applicable to a wide variety of styles and sizes of hitching components and road conditions. For example, some devices can be ineffective in rough terrain or on an incline.

A number of trailer hitching systems comprise targeted light beams. One system utilizes a pair of light beams positioned on a towing vehicle and directed toward a target on a trailer. The light beams are in contrasting colors and are angled relative to the longitudinal axis of the towing vehicle. In order to determine whether the hitching components are in proper alignment for engagement, both of the light beams must intersect at a point on the target, creating a third colored light. This system requires the driver to focus simultaneously on two moving light beams while maneuvering the vehicle to cause the beams to intersect each other at a point. Moreover, problems with depth perception or color blindness could further increase the difficulty of using this system.

Accordingly, a need exists for a trailer hitch alignment system which is accurate, inexpensive and easy to use. There is a need for a durable, sturdy device which can withstand adverse weather conditions. Needs also exist for trailer hitch positioning devices which are useful in any terrain and/or which are compatible with a wide range of coupling units. The present invention satisfies these needs as well as others and overcomes the deficiencies of the prior art.

SUMMARY OF THE INVENTION

In general, the present invention provides for an object alignment device comprising a first light source movable with a first object and a second light source movable with a second object, wherein the first and second light sources emit first and second light beams toward a target associated with a second object. The first light and second light sources are positioned such that, when the first light beam and the second light beam intersect the target, the first object is substantially aligned with the second object. In one aspect, the first light beam comprises at least one ray that is perpendicular to the latitudinal axis of the first object. In another aspect, the first and second light beams intersect the target independently of whether the first and second light beams intersect one another.

The present invention also provides for a trailer hitch alignment device for aligning hitching components used in coupling a trailer to a towing vehicle. This inventive device comprises first and second light sources movable with the towing vehicle and capable of emitting first and second light beams respectively toward a target associated with the trailer. The first light beam comprises at least one ray perpendicular to the latitudinal axis of the towing vehicle. The first and second light sources are positioned such that, when the first light beam and the second light beam intersect the target, the hitching components are substantially aligned for coupling the trailer to said towing vehicle.

The present invention also provides for methods of setting up and/or using the object alignment devices and the trailer hitch alignment devices of the present invention. The devices of the present invention are accurate, easy and effective to use. Moreover, the trailer hitching devices of the present invention can be used on rough terrain or inclines and with almost, if not all, coupling units.

The present invention also provides for a novel object positioning apparatus and related methods. In general, the object positioning apparatus of the present invention can be used for positioning an object upheld by a base over a supporting surface. The object positioning apparatus comprises a plurality of independently adjustable plumb devices associated with the base. The term "plumb device" refers to any device which can test and/or adjust an object's verticality. A particularly suitable object positioning apparatus of the present invention comprises two independently adjustable plumb devices associated with the base, wherein the first plumb device is adjustable from side to side in a horizontal direction (also referred to herein as the "x-axis") and the second plumb device is adjustable from front to back in a lengthwise or longitudinal direction (also referred to herein as the "y-axis").

Although numerous applications of the object positioning apparatus are contemplated herein, in one preferred embodiment, the object positioning apparatus is used to position and support a vertically extending target for use with the trailer hitch alignment device of the present invention. The object positioning apparatus of the present invention can adjust the vertically of a target and support the target vertically over a coupling unit on a trailer, regardless of whether the coupling framework is level. The object positioning apparatus can be employed with a wide variety of sizes and types of hitching components, including one-tongue, as well as A-frame, coupling units. The object positioning apparatus of the present invention also can comprise a tension setting device which provides a secure base for supporting the target.

Other features and advantages of the present invention will become readily apparent to those skilled in the art upon an examination of the following drawings and description of the preferred embodiments.

BRIEF DESCRIPTION OF THE DRAWINGS

FIG. 11 is a rear perspective view of an object positioning device of the present invention showing use in supporting a vertically extending target over a coupling unit on a trailer.

FIG. 12 is a driver's side elevation view of the trailer hitch alignment device of the present invention in use with the object positioning device shown in FIGS. 8-11.

DESCRIPTION OF THE PREFERRED EMBODIMENTS

Figure 1:
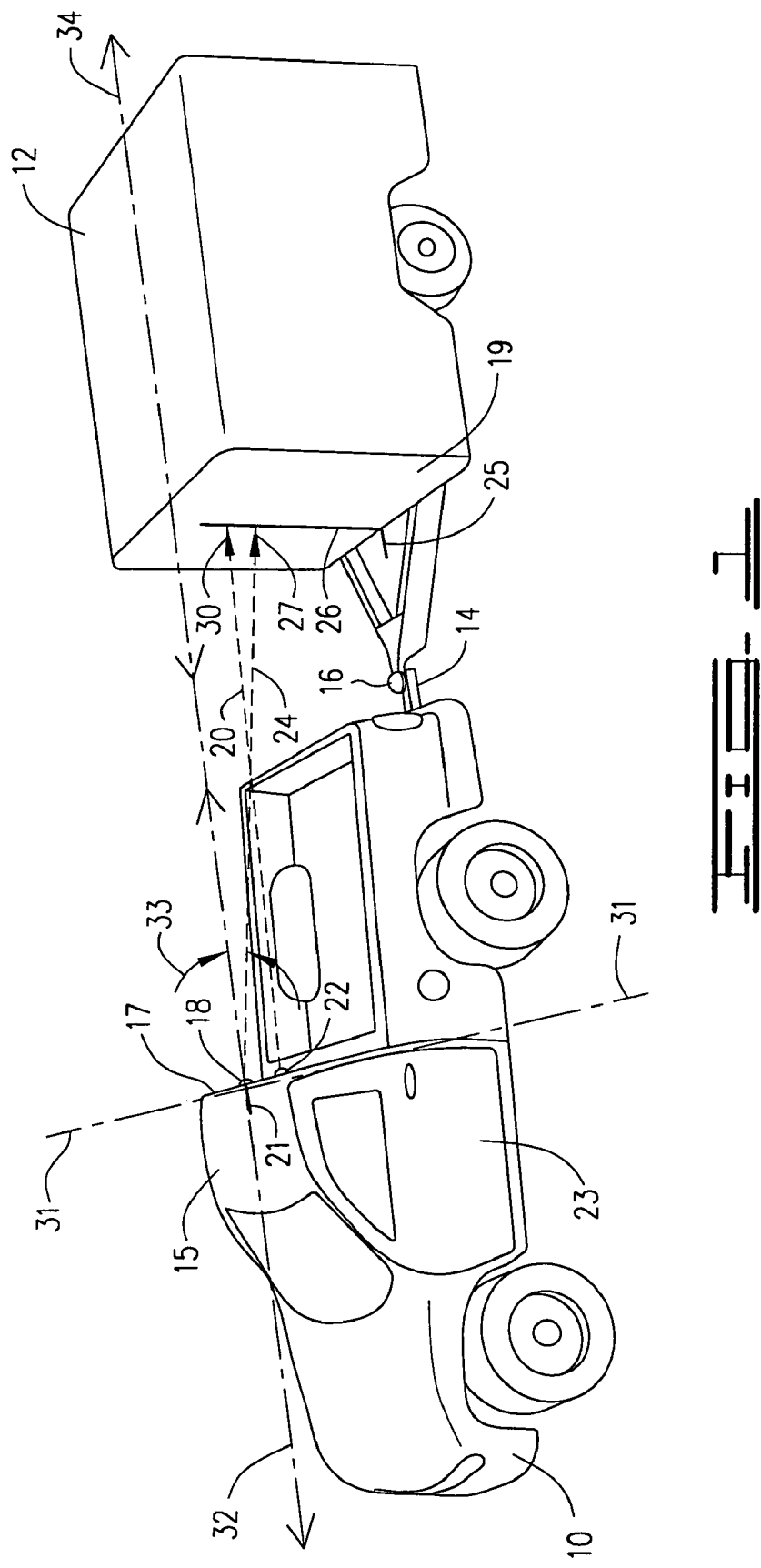
FIG. 1 is a perspective view of a trailer hitching device of the present invention in use on a towing vehicle and trailer when the hitching components are aligned.

As mentioned, the object alignment device of the present invention comprises first and second light sources movable with a first object and capable of emitting first and second light beams toward a target associated with a second object. The term "light beam" as used in herein refers to any ray of light emitted by the light source. The first and second light sources are positioned such that, when the first and second light beams intersect the target, the first object is substantially aligned with the second object. As used herein, the term "aligned" refers to a first object or component being positioned in a desired location or orientation relative to a second object or component. For example, when an axis of a first object is aligned with an axis of a second object, the respective axes have been brought substantially into line with one another or are parallel with one another. When referring to hitching components of a towing vehicle and a trailer, the term "aligned" means that the hitching components are substantially in position for engagement. When the longitudinal axis of the towing vehicle and the trailer are "aligned" and/or the longitudinal axes of the hitching components are "aligned," then the hitching components are substantially in position for engagement except for any remaining vertical or longitudinal distance between the hitching components. The "longitudinal axis" of an object refers to any imaginary level line evenly spanning the length of an object and is not limited to the longitudinal line through the object's center of gravity.

Suitable light sources include but are not limited to lasers, incandescent lights and other sources of collimated light beams. The light sources can emit either continuous or pulsating light beams. The light sources can be positioned in virtually any location on the first object, provided that the first and second light sources can emit first and second light beams toward the target on the second object. Preferably, the distance between the first and second light sources is at least 12 inches.

In one aspect, the first light source is positioned on the first object such that the first light beam comprises at least one ray perpendicular to the latitudinal axis of the first object. The term "latitudinal axis" refers to any imaginary horizontal line evenly spanning the width of the object and is not limited to the horizontal line through the object's center of gravity. As such, the first light beam is at a right angle to the latitudinal axis of the first object. However, the light ray does not necessarily intersect an imaginary horizontal line at the object's center of gravity. In one preferred embodiment, the first light source can be positioned such that the first light beam is parallel to the longitudinal axis of the first object. In this position, the first light beam will intersect the target at a location, independently of the longitudinal distance between the first and second objects.

The first and second light sources also can be positioned such that, when the first and second objects are substantially aligned, the first and second light beams will intersect each other at a location on the target. If pulsating light beams are utilized, the pulsating light beams will move toward the target and each other as the first object is brought into alignment with the second object. When the first and second objects are substantially aligned, the pulsating light beams will intersect each other at a location on the target and will appear to be continuous. However, the first and second light sources also can be positioned such that, when the objects are aligned, the first and second light beams each intersect the target, independently of whether the light beams intersect one another.

In another embodiment, the first light source is positioned on the first object such that the first light beam intersects the target when the longitudinal axes of the first and second objects are substantially aligned. In this configuration, the first light beam will remain on the target as the first object is maneuvered into the desired position relative to the second object. The second light source is positioned such that the second light beam will intersect the target when the first object reaches the desired position.

The target can be constructed out of any material capable of providing a surface upon which the light beams can be viewed. The target can be permanently affixed to or removably positioned on the second object. Preferably, the target is vertically extending.

The object alignment device of the present invention can be used in numerous applications, including but not limited to the positioning of land, air and marine vehicles. For example, the methods and devices of the present invention can be used in docking a boat, parking a car, positioning an aircraft in a desired location at a terminal and maneuvering a vehicle to be towed into position for hitching to a recreational vehicle. The present invention also provides for a trailer hitching device for aligning hitching components used in coupling a towing vehicle to a trailer. Preferred embodiments of this device are illustrated in FIGS. 1-6 and 10-12.

Figure 4:
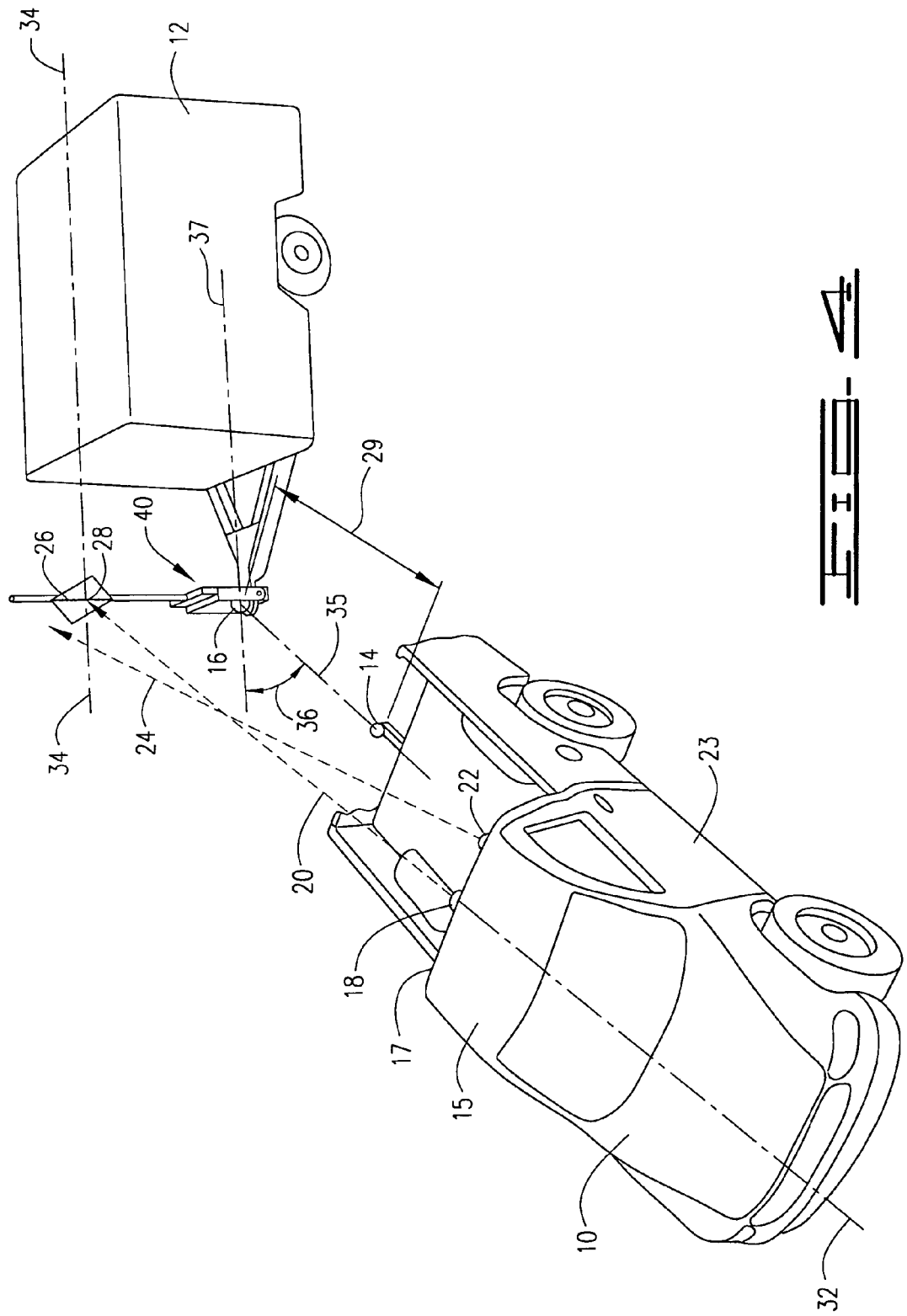
FIG. 4 is a perspective view of a trailer hitching device of the present invention in use on a towing vehicle and trailer showing the towing vehicle being maneuvered at an angle relative to the longitudinal axis of the towing vehicle.

FIG. 1 depicts a trailer hitch alignment device of the present invention during the initial set up or positioning of the device and in use with vehicle 10 in position for coupling with trailer 12. Vehicle 10 comprises a cab 15 and a ball hitch 14. Vehicle 10 has an upper longitudinal axis 32 intersecting first light source 18 and a latitudinal axis 31. Trailer 12 comprises a coupling unit 16 and a front end 19. Trailer 12 has a longitudinal axis 34 intersecting target 16. Referring to FIG. 4, vehicle 10 has a lower longitudinal axis 35 intersecting ball hitch 14, and trailer 12 has a lower longitudinal axis 37 intersecting coupling unit 16.

During the initial set up or positioning of the trailer hitch alignment device of FIG. 1, a target 26 is positioned on front 19 of trailer 12 at trailer front latitudinal midpoint 25. In this embodiment, target 26 extends vertically and is perpendicular to the trailer longitudinal axis 34. Alternatively, on uneven surfaces when the longitudinal axes of the trailer and the vehicle are not aligned, the target can be positioned relative to the trailer such that the target is perpendicular to the towing vehicle longitudinal axis.

As shown in FIG. 1, a first light source 18 is positioned substantially at the cab latitudinal midpoint 21 adjacent to the upper rear edge 17 of cab 15 on towing vehicle 10 such that it emits a first light beam 20 that intersects target 26 at coupled intersection location 27. Optionally, the first light beam can be positioned at any location adjacent to the upper rear edge 17 of cab 11 provided that the target is positioned in a corresponding location associated with the trailer. The first light source 18 is positioned such that first light beam 20 is perpendicular to the latitudinal axis 31 of vehicle 10. Consequently, the first light beam 20 does not deviate side-to-side from the longitudinal axis 32 of vehicle 10. In this particular embodiment, first light beam 20 is not level or parallel to the longitudinal axis 32 of vehicle 10 but is tilted downward at an angle 33. Alternatively, the first light beam can be level or parallel to the longitudinal axis of the towing vehicle or can be tilted upward away from the longitudinal axis. The second light source 22 is positioned on the driver's side 23 of cab 15 adjacent upper rear edge 17 such that it emits a second light beam 24 that intersects target 26 at second light source intersection location 30. The second light source also can be placed at other locations adjacent the rear of the cab; however, it is preferably positioned at least 12 inches from the first light source. In this embodiment, the first light beam 20 and the second light beam 24 do not intersect the target 26 in the same location. Consequently, first light beam 20 and second light beam 24 intersect target 26, independently of whether first light beam 20 and second light beam 24 intersect one another.

After the initial set up or positioning of the trailer hitch alignment device shown in FIG. 1, the ball and coupling unit can be unhitched and the towing vehicle can be moved away from the trailer. Thereafter, the trailer hitch alignment device can be used to align the ball of the towing vehicle with the coupling unit of the trailer. In addition, the trailer hitch alignment device could be used to align the ball of the towing vehicle with a coupling unit of a second trailer with a second target, provided that the second trailer is substantially similarly situated to the first trailer and that the coupling unit on the second trailer has dimensions substantially similar to the coupling unit on the first trailer. Preferably, the second target has substantially the same configuration as the first target and is associated with the second trailer in a position corresponding to the position of the first target on the first trailer.

Figure 2:
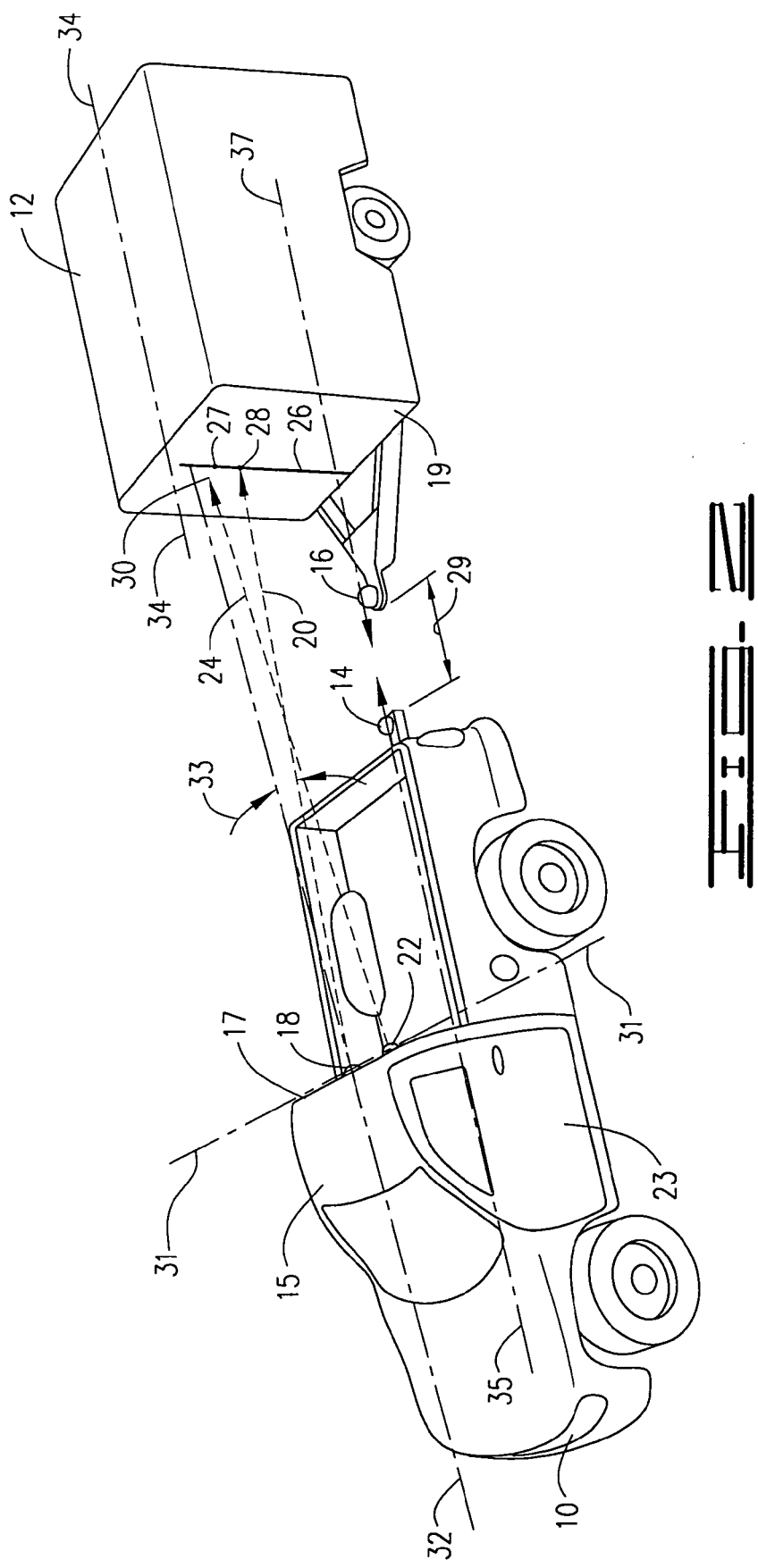
FIG. 2 is a perspective view of a trailer hitching device of the present invention in use on a towing vehicle and trailer when the first but not the second light beam intersects the target.

FIG. 2 illustrates the operation of a trailer hitch alignment device which has been set up as shown in FIG. 1. The towing vehicle 10 is maneuvered toward trailer 12 until first light beam 20 intersects target 26. In the embodiment shown in FIGS. 1-2, when first light beam 20 intersects target 26, towing vehicle longitudinal axis 32 is substantially aligned with trailer longitudinal axis 34. When first light beam 20 intersects target 26, the longitudinal axis 35 of ball hitch 14 is aligned with the longitudinal axis 37 of coupling unit 16. The vehicle 10 is moved straight back in a rearward direction toward trailer 12. The rearward movement of towing vehicle 10 is stopped when second light beam 24 intersects target 26 at second light beam intersection location 30. When second light beam 24 intersects target 26, then ball hitch 14 is in position for engagement with coupling unit 16.

During the rearward movement of towing vehicle 10, as shown in FIG. 2, the first light beam 20 remains on target 26 and the point of intersection moves up target 26 as vehicle 10 approaches trailer 12. Thus, the first light beam 20 intersects target 26 at intermediate intersection location 28 when the ball hitch 14 and coupling 16 are separated by longitudinal distance 29. Referring to FIG. 1, the first light beam 20 intersects target 26 at coupling intersection location 27 when the ball hitch 14 and coupling unit 16 are in position for engagement. As illustrated in FIGS. 1-2, the first light source 18 is positioned such that first light beam 20 is tilted downward from towing vehicle longitudinal axis 32 at angle 33. If first light source 18 is positioned such that first light beam 20 is parallel to towing vehicle longitudinal axis 32, then first light beam 20 intersects target 26 at second light beam intersection location 28 regardless of the longitudinal distance 29 between ball hitch 14 and coupling unit 16. If first light source 18 is positioned such that first light beam 20 is tilted upward away from towing vehicle longitudinal axis 32, then first light beam 20 would intersect target 26 at an intermediate intersection point 28 which would be below first light beam coupling intersection location 27.

Figure 3:
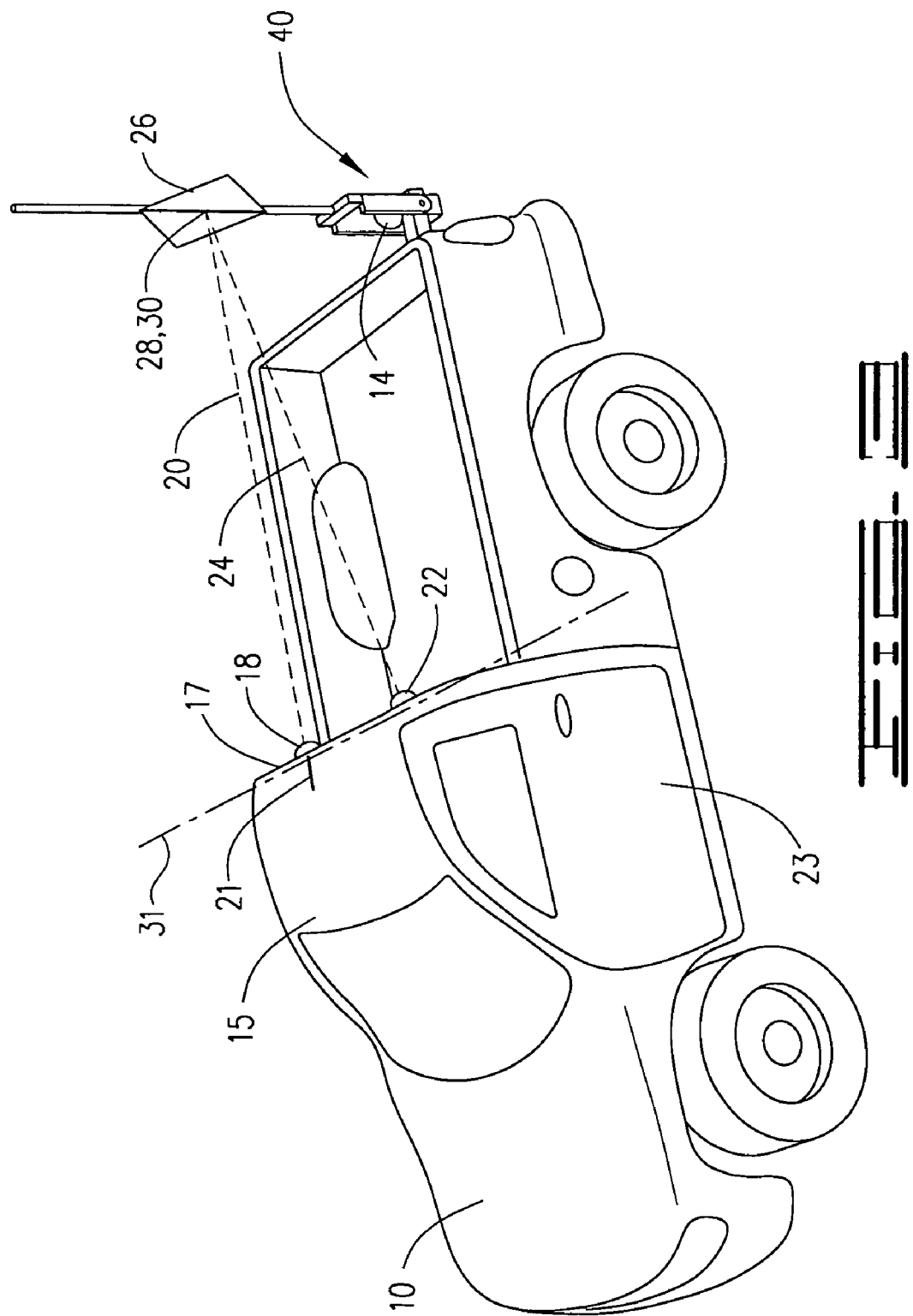
FIG. 3 is a perspective view of a trailer hitching device of the present invention during initial set-up.
Figure 5:
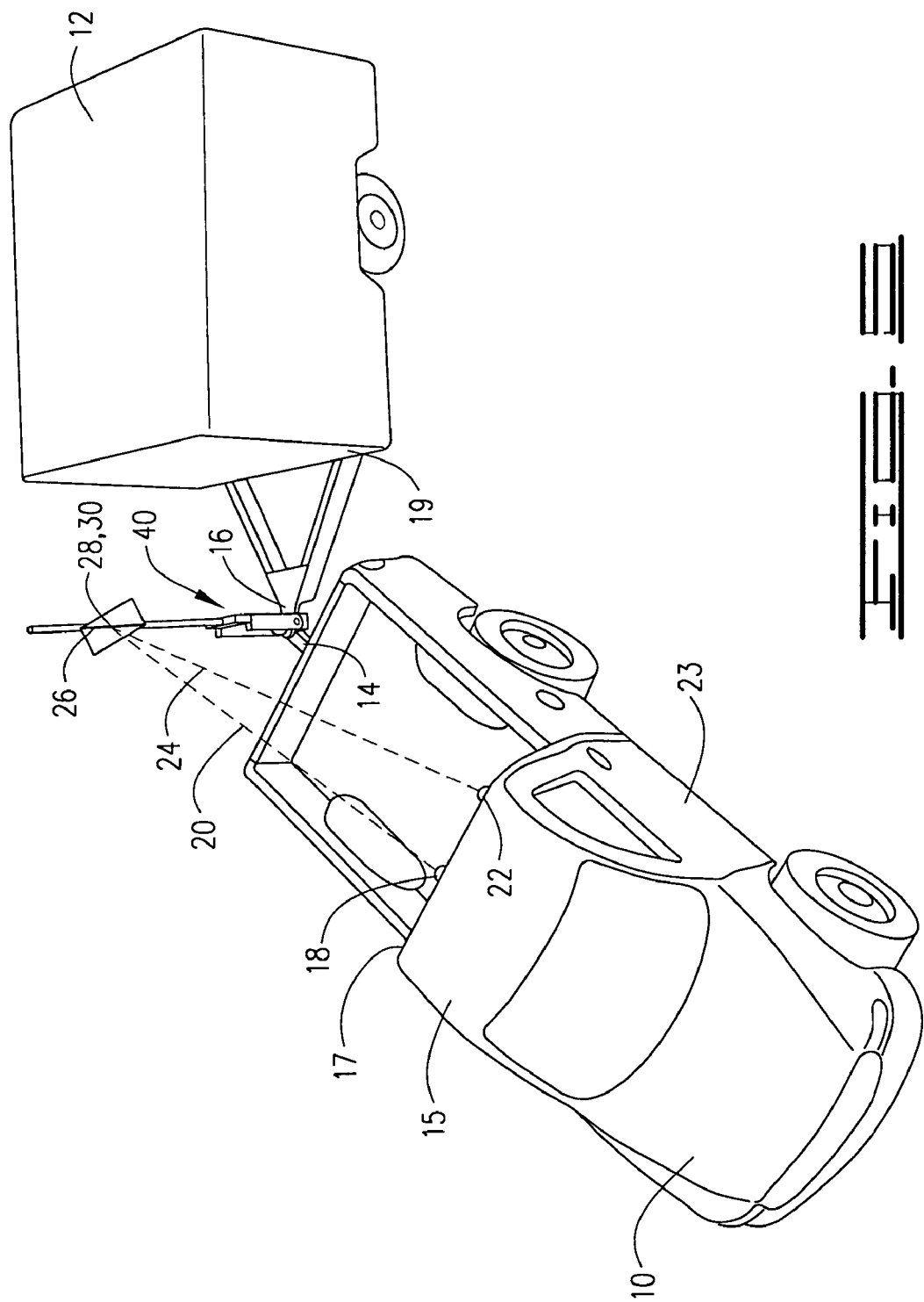
FIG. 5 is a perspective view of the trailer hitch alignment device of FIG. 4 in use on a towing vehicle and trailer when the hitching components are aligned.

In an alternative embodiment illustrated in FIGS. 3-5, the trailer hitch alignment device is initially set up by positioning target 26 over ball hitch 14 of vehicle 10. Optionally, during set up, target 26 can be releasably attached to coupling unit 16 of trailer 12 with ball hitch 14 directly beneath coupling unit 16 in position for engagement. In the embodiment depicted in FIGS. 3-5, target 26 extends vertically and is perpendicular to towing vehicle longitudinal axis 32. As shown in FIG. 3, a first light source 18 is positioned substantially at the cab latitudinal midpoint 21 adjacent to the upper rear edge 17 of cab 15 on towing vehicle 10 such that it emits a first light beam 20 that intersects target 26 at first light beam coupled intersection location 27. The first light source 18 is positioned such that first light beam 20 is perpendicular to the latitudinal axis 31 of towing vehicle 10. In the embodiment depicted in FIGS. 3-5, first light beam 20 is parallel to towing vehicle longitudinal axis 32. The second light source 22 is positioned on the driver's side 23 of cab 15 adjacent upper rear edge 17 such that it emits a second light beam 24 that intersects target 26 at second light source intersection location 30. The first light beam 20 and the second light beam 24 intersect the target 26 such that the first beam coupled intersection location 27 at least partially overlaps the second light beam coupled intersection location 30.

Subsequent to the initial set up or positioning of the trailer hitch alignment device shown in FIG. 3, target 26 is removed from ball hitch 14. FIG. 4 illustrates the operation of a trailer hitch alignment device which has been set up as shown in FIG. 3. To use the trailer hitch alignment device to align the hitching components of towing vehicle 10 and trailer 12, target 26, or optionally a second target similarly configured to target 26, is positioned over coupling unit 16 as depicted in FIG. 4. Target 26 is positioned in association with trailer 12 such that target 26 extends vertically over coupling unit 16. Alternatively, where trailer 12 and/or towing vehicle 10 are located on an incline or on rough or otherwise uneven terrain, target 26 can be positioned over coupling unit 16 such that target 26 is perpendicular to towing vehicle longitudinal axis 35.

As depicted in FIGS. 4-5, towing vehicle 10 is maneuvered toward trailer 12 until first light beam 20 intersects target 26 at first light beam intermediate intersection location 28. When first light beam 20 intersects target 26, the plane comprising upper vehicle longitudinal axis 32 and lower ball hitch longitudinal axis 35 substantially intersects the plane comprising upper target longitudinal axis 34 and lower coupling unit longitudinal axis 37 at coupling unit 16 to form angle 36. Angle 36 is preferably approximately in the range of from about 0 degrees to about 45 degrees. Target 26 can be swiveled around over coupling unit 16 to accommodate an approach by vehicle 10 at angle 36. Once first light beam 20 intersects target 26, vehicle 10 is then moved straight back in a rearward position toward coupling unit 16 such that second light beam 24 moves toward target 26. Referring to FIG. 5, the rearward movement of vehicle 10 is stopped when second light beam 24 intersects target 26 at second light beam target intersection location 30 and ball hitch 14 is in position for engagement with coupling unit 16.

Figure 6:
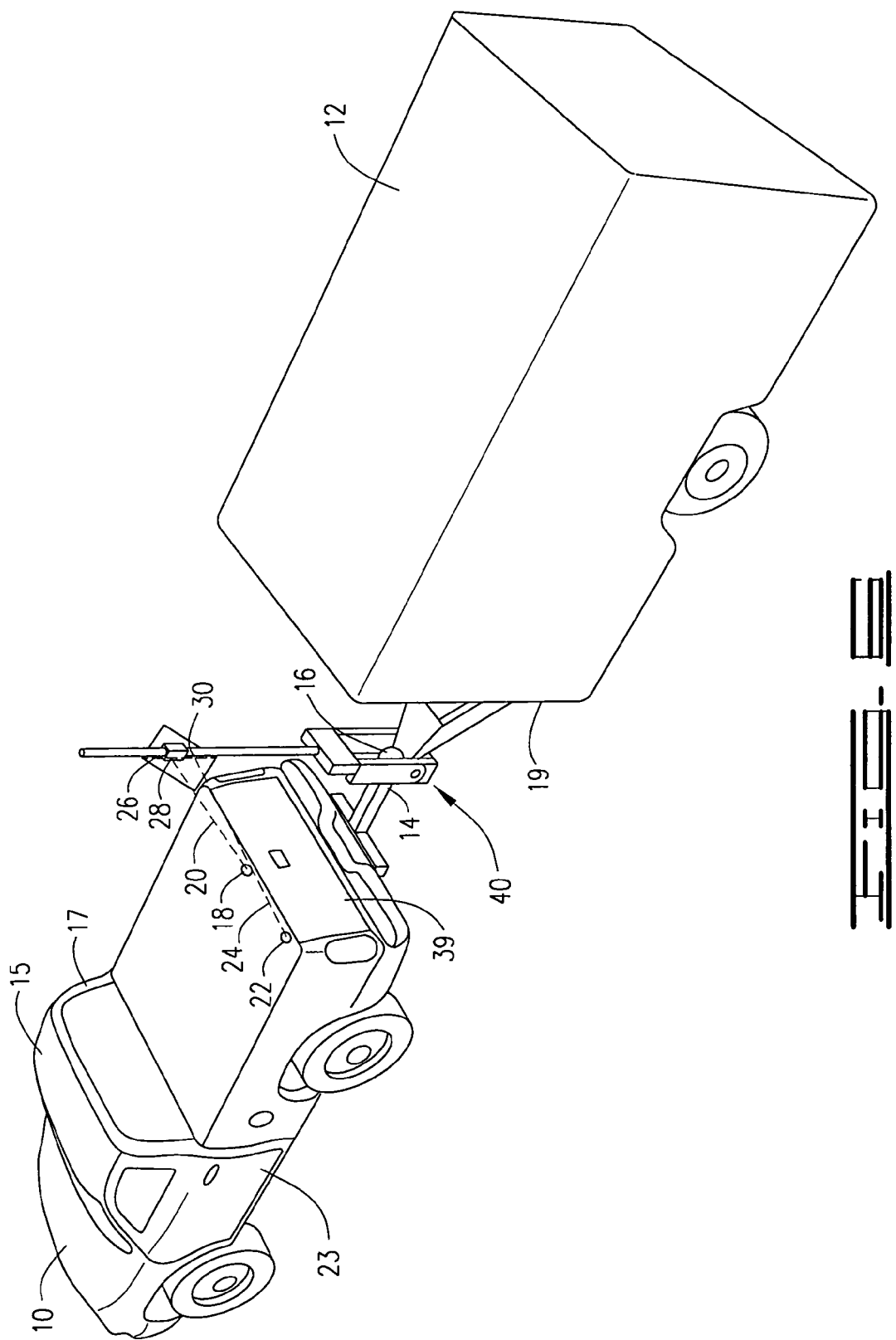
FIG. 6 is a perspective view of a trailer hitching device of the present invention with first and second light sources positioned adjacent the rear of the towing vehicle when the hitching components are aligned.

FIG. 6 illustrates an alternative embodiment of the trailer hitch alignment device of the present invention as shown when the hitching components of the vehicle and trailer are substantially in position for engagement. During initial set up or positioning of the trailer hitch alignment device, first light source 18 and second light source 22 are positioned adjacent to the rear 39 of vehicle 10. As in other embodiments, first and second light sources 20, 22 are positioned such that they emit first and second light beams 18, 24 respectively that intersect target 26 at first light beam coupled intersection location 27 and second light beam intersection location 30.

Figure 7:
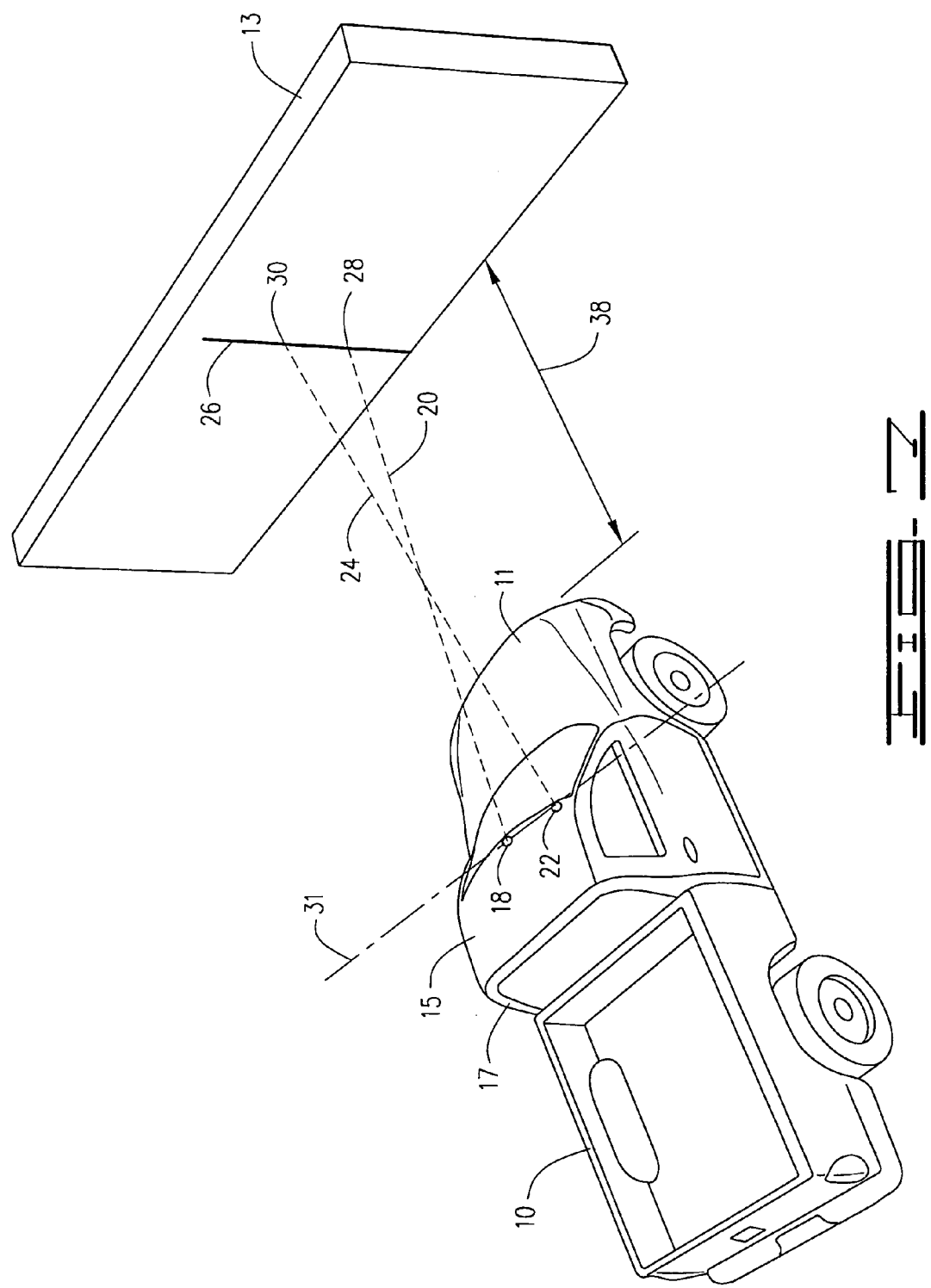
FIG. 7 is a perspective view of an object alignment device of the present invention with first and second light sources positioned adjacent the front of the cab of a vehicle.

FIG. 7 shows an embodiment of a vehicle alignment device of the present invention in which a vehicle 10 is aligned with or brought into a desired position relative to a wall 13. Vehicle 10 comprises a front end 11. During the initial set up of the vehicle alignment device, target 26 can be positioned adjacent to or affixed to wall 13. The front end 11 of vehicle 10 is positioned at a desired longitudinal distance 38 from wall 13. First light source 18 is positioned on cab 15 and directed toward front 11 of vehicle 10 such that it emits a first light beam 20 toward wall 13 that intersects target 26 at first light beam coupled intersection location 27. In the embodiment illustrated in FIG. 7, first light source 18 is positioned such that first light beam 20 is perpendicular to vehicle latitudinal axis 31. Second light source 22 is positioned on cab 15 and directed toward front 11 of vehicle 10 such that second light source 22 emits a second light beam 24 toward wall 13 that intersects target 26 at second beam intersection point 30. In this configuration, first light beam 20 and second light beam 24 do not intersect target 26 at a common location. In the alternative, the first light source 18 and second light source 22 can be positioned on vehicle 10 such that first light beam coupled intersection location 27 and second light beam intersection location 30 at least partially overlap. First and second light sources 18, 22 could also be positioned in any location on vehicle 10 that is suitable for use in accordance with the present invention. For example, the device could comprise first and second light sources 18, 22 positioned as shown in FIG. 1 toward the rear 17 of cab 15. Such a device can be useful for backing a vehicle into position in a parking space in a garage while leaving a desired distance between the back bumper and the wall of the garage.

After the initial set up shown in FIG. 7, vehicle 10 can be moved out of position from longitudinal distance 38. Thereafter, vehicle 10 can be realigned to wall 13 at target 26 by maneuvering vehicle 10 toward wall 13 such that first light beam 20 intersects target 26. Once the first light beam 20 intersects target 26, vehicle 10 is moved straight forward toward wall 13 as second light beam 24 moves toward target 26. Movement of vehicle 10 is stopped when second light beam 24 intersects target 26. Numerous other applications of this technology are contemplated, including but not limited to docking a boat and positioning an airplane at a terminal.

The present invention also provides an object positioning apparatus for use in positioning an object upheld by a base over a supporting surface. Basically, the object positioning apparatus of the present invention comprises a plurality of independently adjustable plumb devices associated with the base. The term "plumb device" refers to any device which can test and/or adjust an object's verticality. Preferred embodiments of the object positioning apparatus of the present invention are illustrated in FIGS. 8-12.

Figure 8:
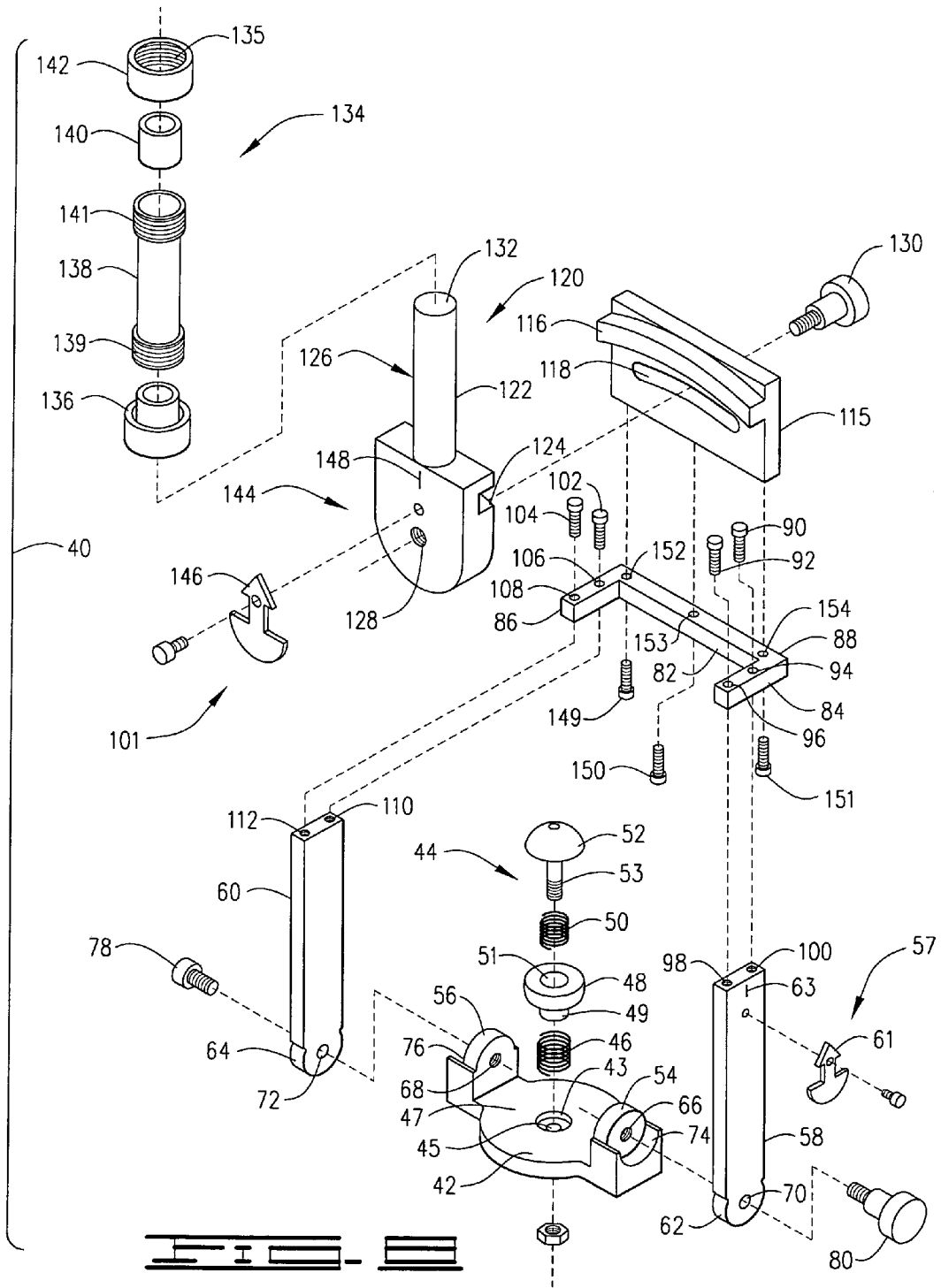
FIG. 8 is an exploded perspective view of the components of an object positioning device of the present invention.

FIG. 8 is an exploded perspective view of a preferred embodiment of an object positioning apparatus of the present invention. Object positioning apparatus 40 comprises a main base 42 for supporting a two-piece spring-loaded ball 44, first and second independently adjustable plumb devices 57 and 101, and an object support member 120 encased in a split-locking sleeve 134.

Main base 42 has a central platform 47 with a threaded central circular indention 43 internally defining lower central opening 45. Main base 42 additionally comprises opposing first and second circular members 54 and 56, each defining first and second inner circular openings 66 and 68. Outside of and adjacent to each of first and second circular members 54 and 56 are first and second inverted arched base members 74 and 76 respectively.

Referring to FIG. 8, the two-piece spring-loaded ball 44 comprises a threaded top bolt 52 which engages into correspondingly threaded central circular indention 43 of main base 42 and a lower semi-circular member 48 sandwiched between upper spring 50 and lower spring 46 which fits into central circular indention 43. Lower semi-circular member 48 defines a hollow center 51 and comprises a lower portion 49 configured to fit within central circular indention 43. Upper spring 50 fits at least partially inside hollow center 51 of lower semi-circular member 48. Threaded top bolt 52 comprises an elongated bottom member 53. Threaded elongated bottom member 53 protrudes through top spring 50, hollow center 51 of lower semi-circular member 48 and lower spring 46 and engages down into correspondingly threaded central circular indention 43 of main base 42.

As shown in FIG. 8, object positioning apparatus 40 comprises first and second arms 58 and 60 having first and second rounded bottom ends 62 and 64 and first and second top sides 93 and 95 respectively. First arm top side 93 comprises threaded front and back openings 98 and 100. Second arm top side 95 comprises threaded front and back openings 112 and 110. First and second rounded bottom ends 62 and 64 define first and second outer circular openings 70 and 68 respectively. First and second inverted arched base members 74 and 76 cradle first and second rounded bottom ends 62 and 64 such that first outer circular opening 70 corresponds to first inner circular opening 66 and second outer circular opening 72 corresponds to second inner circular opening 68. First arm 58 is adjustably attached to first circular member 54 with side thumb screw 80 threaded into first inner circular opening 66 through first outer circular opening 70. Second arm 60 is adjustably attached to second circular member 56 with small threaded bolt 78 threaded into second inner circular opening 68 through second outer circular opening 72.

Object positioning apparatus 40 comprises a first plumb device 57 and a second plumb devise 101. First plumb device 57 comprises a longitudinally oriented counterweighted pendulum 61 rotatably affixed to first arm 58 beneath y-axis vertical reference 63. Second plumb device 101 comprises a horizontally oriented counterweighted pendulum 146, a vertically extending object support member 120 slidably connected to rectangular member 115, and a U-shaped frame 82 supporting rectangular member 115. Rectangular member 115 comprises an arched key 116 and a horizontally oriented slot 118. Object support member 120 comprises an inner side 126, an outer side 144, an upwardly extending vertical column 122 and a lower circular opening 128. On inner side 126 of object support member 120 is an arched keyway 124 for receiving arched key 116. With arched keyway 124 mated with arched key 116, object support member 120 is slidably and adjustably connected to rectangle member 115 with back thumb screw 130 engaging in lower circular opening 128 through slot 118.

U-shaped frame 82 comprises a first side 84, a second side 86 and a back side 88. First side 84 comprises front and back first side openings 94 and 96. Second side 86 comprises front and back second side openings 106 and 108. Back side 88 comprises first, second and third back openings 152, 153 and 154. Rectangular member 115 is secured to back side 88 with first, second, and third back screws 149, 150 and 151 engaging first, second and third back openings 152, 153 and 154 respectively. First arm 58 is joined to U-shaped frame 82 at first side 84 with front and back first side threaded screws 92 and 90 that extend through front and back first side openings 94 and 96 and engage into correspondingly threaded first arm front and back openings 98 and 100. Second arm 60 is joined to U-shaped frame 82 at second side 86 with front and back second side threaded screws 104 and 102 respectively that extend through front and back second side openings 108 and 106 respectively and engage into correspondingly threaded second arm front and back openings 112 and 110.

Figure 9:
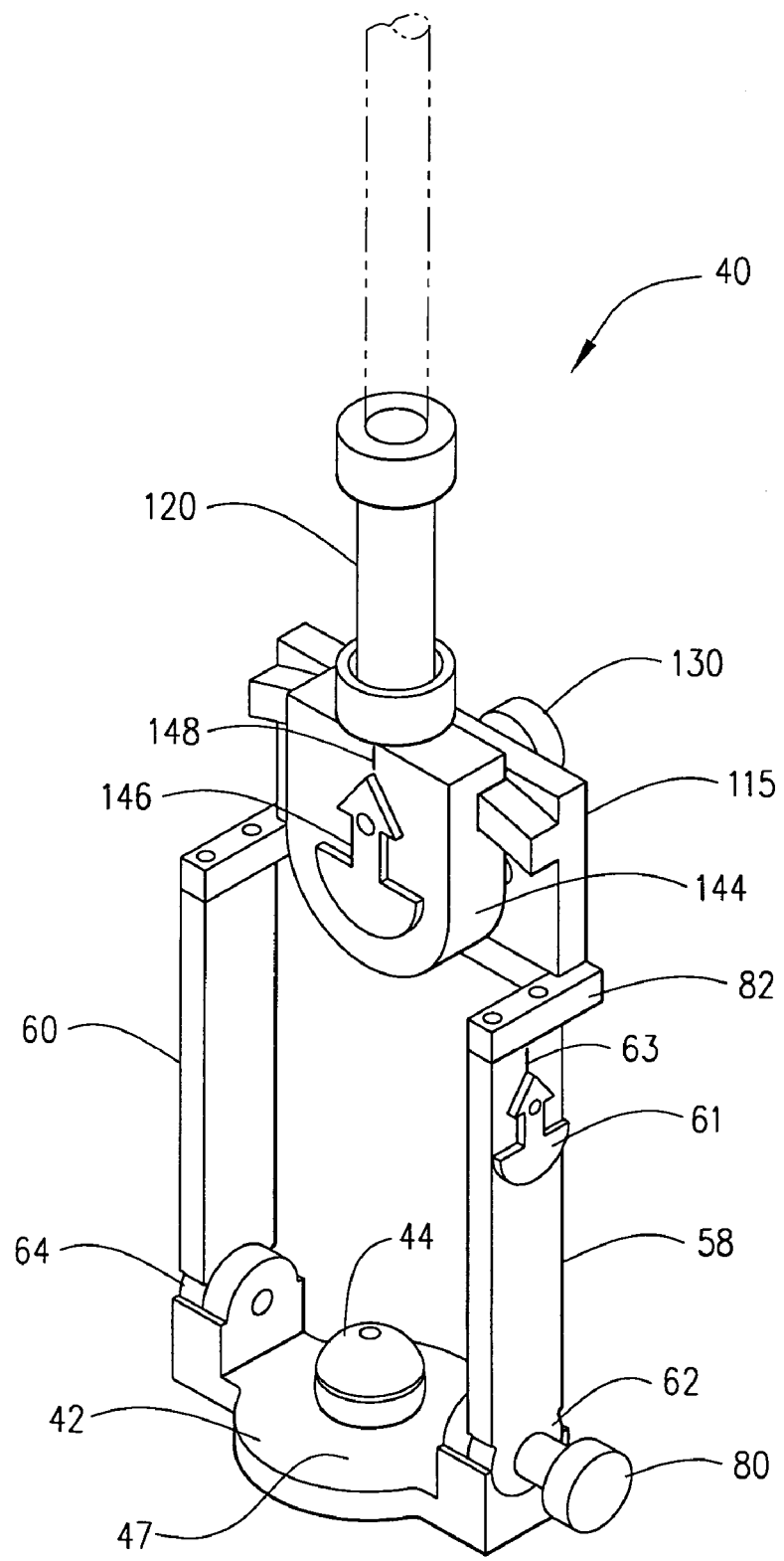
FIG. 9 is a perspective view of an object positioning device of the present invention.
Figure 10:
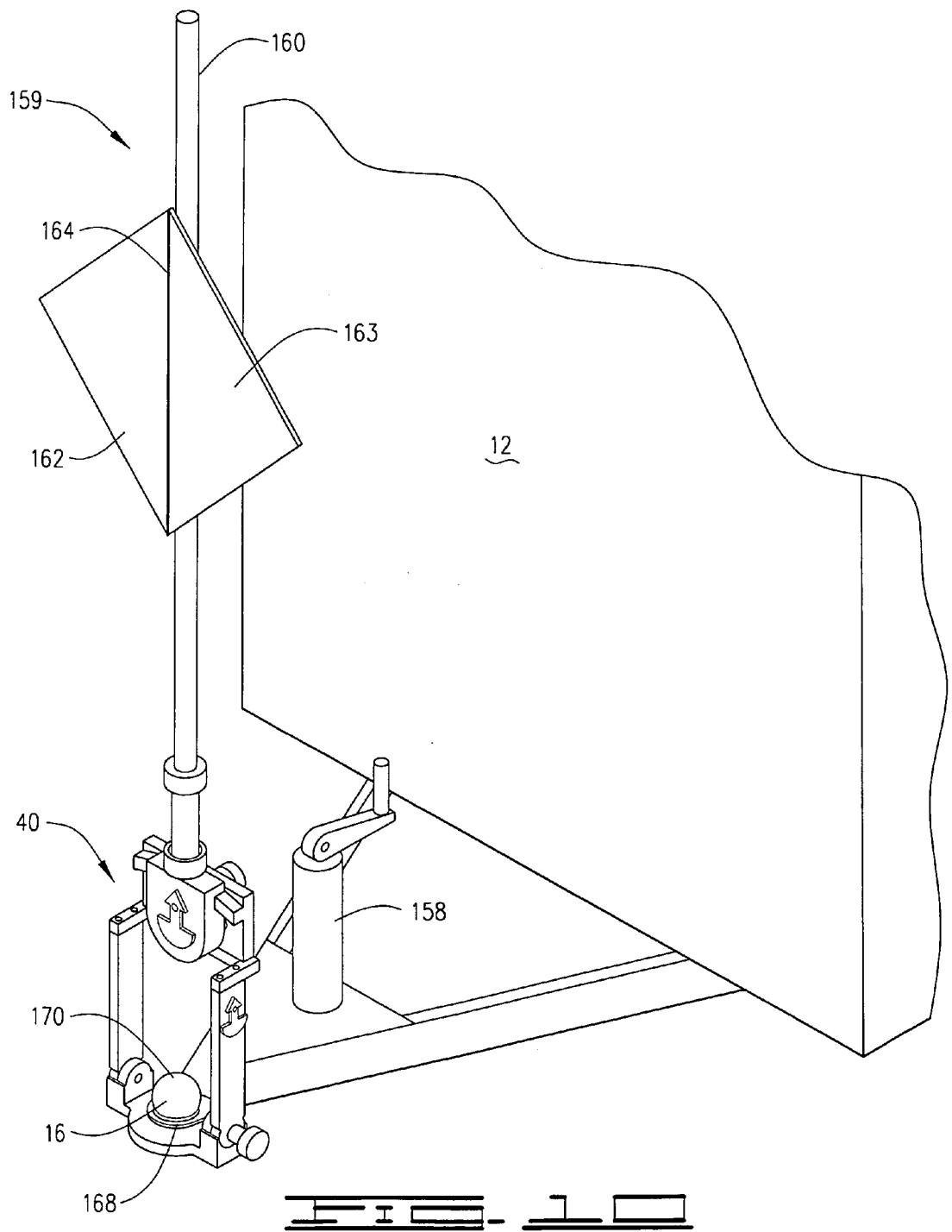
FIG. 10 is a perspective view of an object positioning device of the present invention showing use in supporting a vertically extending target over a coupling unit on a trailer.

The split locking sleeve 134 has a top opening 135 and comprises a dual threaded center shaft 138 which has a top threaded end 141 and a bottom threaded end 139 and which is inserted with internal ring 140 and bounded by a correspondingly threaded upper locking lid 142 and a correspondingly threaded lower locking ring 136. Split locking sleeve 134 is configured to fit over upwardly extending vertical column 122 and is releasably attached thereto by screwing correspondingly threaded lower locking ring 136 onto bottom threaded end 139. As shown in FIGS. 8-10, during use of object positioning apparatus 40, a support pole 160 for supporting an object is inserted into upwardly extending vertical column 122 inside split locking sleeve 134 through top opening 133 and is secured therein with internal ring 140. Object support pole 160 is releasably locked into split locking sleeve 134 by screwing threaded upper locking lid 142 onto top threaded end 141.

The object positioning apparatus illustrated in FIGS. 8-9 is useful in testing and adjusting the verticality of an object. Although a variety of uses are contemplated, the object positioning apparatus of the present invention is particularly suitable for positioning a vertically extending target for use in the trailer hitch alignment device disclosed herein. FIGS. 10 and 11 show object positioning apparatus 40 in use in supporting a vertical target apparatus 159 comprising support pole 160 and a target plate 162. Target plate 162 comprises a front side 163 and a back side 165. On front side 163 of target plate 162 is a target 26. On back side 165 of target plate 162 is a thumb screwed clamping device 166 through which support pole 160 is inserted. Target plate 162 is vertically slidable along support pole 160 and is releasably attached thereto with thumb screwed clamping device 166. Referring to FIGS. 9-11, object positioning apparatus 40 is releasably attached to coupling unit 16 of trailer 12. Trailer 12 comprises a locking lever 156, and a crank 158 for adjusting the height of the coupling unit 16. Coupling unit 16 comprises a flange 168 that supports an upwardly extending hollow ball 170. In use, the object positioning device 40 is releasably attached to the coupling unit 16 of trailer 12. The coupling unit 16 is positioned between first and second arms 58 and 60 over two-piece spring-loaded ball 44 which nests inside hollow ball 170 of coupling unit 16. The flange 168 of coupling unit 16 is releasably locked down against central platform 47 of main base 42 with locking lever 156.

The two-piece spring-loaded ball 44 provides adjustable tension inside hollow coupling ball 170 such that object positioning apparatus 40 is securely upheld directly over coupling unit 16. The two-piece spring-loaded ball 44 can be modified to conform to different sizes of couplings. A plurality of diameter-increasing sleeves (not shown) can be internally and externally configured to nest one inside another. The innermost diameter-increasing sleeve can be internally configured to receive lower semi-circular member 48. The inner-most diameter-increasing sleeve can be slipped externally around lower semi-circular member 48 to increase the diameter of the two-piece spring-loaded ball 44. One or more additional diameter-increasing sleeves can be slipped around the innermost diameter-increasing sleeve to incrementally increase the diameter of the two-piece spring-loaded ball 44. In effect, the two-piece spring-loaded ball can be modified with one or more diameter-increasing sleeves to provide suitable tension in coupling units of greater diameter.

To use the object positioning apparatus 40 for testing and adjusting the verticality of vertical target 159 over coupling unit 16 as shown in FIG. 9-10, the object positioning apparatus 40 is secured to coupling unit 16 as described above. Thereafter, the longitudinally oriented counterweighted pendulum 61 is evaluated to determine if it points upward toward y-axis vertical reference 63. If not, side thumb screw 80 is loosened and first arm 58 is rotated forward or backward until longitudinally oriented counterweighted pendulum 61 points upward toward y-axis vertical reference 63. Side thumb screw 80 is then tightened to secure first arm 58 to first circular member 54. The horizontally oriented counterweighted pendulum 146 is also reviewed to determine if it points upward toward x-axis vertical reference 148. If not, back thumb screw 130 is loosened and vertically extending support member 120 is slidably adjusted left or right along rectangular member 115 until horizontally oriented counterweighted pendulum 146 points upward toward reference point 148. Back thumb screw 130 is then tightened to releasably secure vertically extending support member 120.

After adjusting the verticality of the object positioning apparatus 40, the support pole 160 of vertical target 159 is inserted into top opening 140 of split locking sleeve 134. Object support pole 160 is releasably locked into split locking sleeve 134 by screwing threaded upper locking lid 142 onto correspondingly threaded top threaded end 141. As shown in FIG. 11, target plate 162 can be slidable adjusted upward or downward with thumb screwed clamping device 166 to a suitable height which is viewable to the driver and on which the intersecting light beams of the trailer hitch alignment device can be viewed.

The set up of the trailer hitch alignment device for use with the vertical target 162 is similar to the methods previously described in other embodiments. Referring now to FIG. 12, first light source 18 (not shown) is positioned substantially at the cab latitudinal midpoint 21 adjacent to the upper rear edge 17 of cab 11 on vehicle 10 such that it emits a first light beam 20 that intersects target 26 at coupled intersection location 28. The first light source 18 is positioned such that first light beam 20 is perpendicular to the latitudinal axis 31 of towing vehicle 10. The second light source 22 is positioned on the driver's side 23 of cab 15 adjacent upper rear edge 17 such that it emits a second light beam 24 that intersects target 26 at second light source intersection location 30. As mentioned, the first and second light sources 18, 22 can be configured in a variety of ways in accordance with the present invention. In another preferred embodiment, the first and second light sources 18 and 22 can be pre-positioned during manufacture and located, for example, in the third light display adjacent the rear of the cab.

To use the trailer hitch alignment device in association with vertical target 26, the verticality of the object alignment device 40 is calibrated as described above and the vertical target is positioned therein at the desired height. As shown in FIG. 12, coupling unit 16 should be positioned at a height that provides sufficient clearance for ball hitch 14 to pass underneath the object positioning device 40 beneath flange 168 of coupling unit 16. The amount of clearance required depends upon the size and type of hitching components employed. Typically, a clearance in the range of from about 1 inch to about 3 inches is sufficient to enable the top of ball hitch 14 to be placed directly under coupling unit 16. One method of quickly determining the distance from the ground to the top of ball hitch 14 is to use target apparatus 159 as a reference point. Placing supporting pole 160 adjacent ball hitch 14, target plate 162 is lowered by loosening thumb screw clamping device 166 until the bottom of target plate 162 is level with the top of ball hitch 14. The thumb screw clamping device 166 is tightened to secure target plate 162. The supporting pole 160 can be placed adjacent object positioning apparatus 40 on coupling unit 16. Thereafter, the coupling unit 16 can be lifted if necessary to a suitable height with crank 158 to ensure that the bottom of the object positioning apparatus 40 is higher than the top of ball hitch 14.

FIGS. 4, 6 and 12 show embodiments of the trailer hitch alignment device in use with target apparatus 159 supported by object positioning apparatus 40 over coupling 16. Vehicle 10 is maneuvered toward trailer 12 until first light beam 20 intersects target 26 at first light beam intersection point 28. Vehicle 10 is then moved straight back in a rearward direction toward coupling unit 16 such that second light beam 24 moves toward target 26. The rearward movement of towing vehicle 10 is stopped when second light beam 24 intersects target 26 at second light beam target intersection point 30. The object positioning device 40 can be removed from coupling unit 16 and the ball hitch 14 of vehicle 10 can be engaged into coupling unit 16.

The object alignment device and methods of the present invention are also beneficial for using the trailer hitch alignment device on uneven or rough terrain where the longitudinal axis of vehicle 10 is not level with the ground. Instead of calibrating longitudinally oriented counterweighted pendulum 61 and horizontally oriented counterweighted pendulum 146, side thumb screw 80 can be loosened and target apparatus 159 can be tilted forward or backward until first and second light beams 20 and 24 intersect target 26. The target apparatus 159 can be adjusted such that the target 26 is perpendicular to the upper longitudinal axis 32 of towing vehicle 10.

The devices and methods of the present invention address the deficiencies in the prior art. The present invention is well adapted to attain the ends and advantages mentioned as well as those which are inherent therein. While numerous changes can be made by those skilled in the art, such changes are encompassed within the spirit of this invention as defined by the following claims.

What is claimed is:

1. An object alignment device, comprising:
a first light source movable with a first object, said first light source capable of emitting a first light beam toward a target associated with a second object, said first light beam comprising at least one ray perpendicular to the latitudinal axis of said first object; and
a second light source movable with said first object, said second light source capable of emitting a second light beam toward said target;
wherein said first light source and second light source are positioned such that, when said first light beam and said second light beam intersect said target, said first object is substantially aligned with said second object.

2. The object alignment device of claim 1, wherein said target extends vertically.

3. The object alignment device of claim 1, wherein said first light source is positioned on said first object such that said first light beam comprises at least one ray that intersects said target when the longitudinal axes of said objects are substantially aligned.

4. The object alignment device of claim 1, wherein said first light source is positioned on said first object such that said first light beam comprises at least one ray that intersects said target at a location, independent of the longitudinal distance between said objects.

5. The object alignment device of claim 1, wherein the distance measured along the horizontal axis between said first light source and said second light source is at least about 12 inches.

6. The object alignment device of claim 1, wherein one of said light sources emits a pulsating light beam.

7. The object alignment device of claim 6, wherein said first light beam is pulsating and said second light source is positioned on said first object such that said second light beam comprises at least one ray that intersects said pulsating first light beam on said target when said objects are substantially aligned.

8. An object alignment device, comprising:
a first light source movable with a first object, said first light source capable of emitting a first light beam toward a target associated with a second object; and
a second light source movable with said first object, said second light source capable of emitting a second light beam toward said target;
wherein said first light source and second light source are positioned such that, when said first object is substantially aligned with said second object, said first light beam and said second light beam intersect said target, regardless of whether said first and second light beams intersect one another.

9. The object alignment device of claim 8, wherein said target extends vertically.

10. The object alignment device of claim 8, wherein said first light beam comprises at least one ray that is perpendicular to the latitudinal axis of said first object.

11. The object alignment device of claim 8, wherein said first light source is positioned on said first object such that said first light beam comprises at least one ray that will intersect said target and will stay on said target as the longitudinal distance between said objects changes.

12. The object alignment device of claim 8, wherein the distance between said first light source and said second light source is at least about 12 inches.

13. The object alignment device of claim 8, wherein at least one of said light sources emits a pulsating light beam.

14. A trailer hitch alignment device for aligning hitching components used in coupling a trailer to a towing vehicle, comprising:
a first light source movable with said towing vehicle, said first light source capable of emitting a first light beam toward a target associated with said trailer, said first light beam comprising at least one ray perpendicular to the latitudinal axis of said towing vehicle; and a second light source movable with a towing vehicle, said second light source capable of emitting a second light beam toward said target;

wherein said first light source and second light source are positioned such that, when said first light beam and said second light beam intersect said target, said hitching components are substantially aligned for coupling said trailer to said towing vehicle.

15. The trailer hitch alignment device of claim 14, wherein said target extends vertically.

16. The trailer hitch alignment device of claim 14, wherein said first light source is positioned on said towing vehicle such that said first light beam comprises at least one ray that intersects said target at a location, independently of the longitudinal distance between said hitching components.

17. The trailer hitch alignment device of claim 14, wherein said first light source is positioned on said towing vehicle such that said first light beam is substantially parallel to the longitudinal axis of said towing vehicle.

18. The trailer hitch alignment device of claim 14, wherein the distance between said first light source and said second light source is at least about 12 inches.

19. The trailer hitch alignment device of claim 14, wherein said first light beam is pulsating and said second light source is positioned on said towing vehicle such that said second light beam at least partially intersects said intermittent first light beam on said target when said hitching components are substantially aligned.

20. The trailer hitch alignment device of claim 14, wherein said hitching components comprise a ball associated with said towing vehicle and a coupling unit associated with said towing vehicle, said target being positioned substantially at the vertical axis of said coupling unit.

21. The trailer hitch alignment device of claim 14, wherein said first light source is positioned on said towing vehicle such that said first light beam comprises at least one ray that forms an angle with the longitudinal axis of said trailer, said angle having a vertex at said target and having a measurement of about 45 degrees or less.

22. A method of using the trailer hitch alignment device of claim 14, comprising the steps of:
(a) moving said towing vehicle toward said trailer such that said first light beam intersects said target;
(b) moving said towing vehicle in a rearward direction toward said trailer such that said second light beam moves toward said target; and
(c) stopping rearward movement of said towing vehicle when said second light beam intersects said target.

23. A method of positioning an object alignment device for use in aligning first and second objects, comprising the steps of:
(a) placing a target in association with said second object; and
(b) positioning first and second light sources on said first object such that when said first and second objects are substantially aligned said first light source emits a first light beam having at least one ray intersecting said target and said second light source emits a second light beam having at least one ray intersecting said target, regardless of whether said first and second light beams intersect one another.

24. The method of claim 23, further comprising the steps of:
(c) moving said first object toward said second object such that said first light beam intersects said target;

(d) moving said first object toward said second object such that said second light beam moves toward said target; and
(e) stopping movement of said first object when said second light beam intersects said target.

25. The method of claim 23, further comprising the steps of:
(c) moving said second object toward said first object such that said first light beam intersects said target;
(d) moving said second object toward said first object such that said second light beam moves toward said target; and
(e) stopping movement of said second object when said second light beam intersects said target.

26. The method of claim 24, wherein step (c) comprises moving said first object toward said second object such that said first light beam intersects said target and stays on said target as the longitudinal distance between said first and second objects changes.

27. The method of claim 24, wherein said first light beam remains on said target during step (d).

28. The method of claim 24, wherein step (d) comprises moving said first object toward said second object in a direction parallel to the longitudinal axis of said first object.

29. The method of claim 24, further comprising connecting said first object to said second object.

30. The method of claim 23, further comprising positioning said first light source on said first object such that said first light beam comprises at least one ray lying in a plane that is substantially parallel to the longitudinal axis of said first object.

31. The method of claim 23, wherein said target extends vertically.

32. The method of claim 23, wherein said first object is a towing vehicle and said second object is a trailer.

33. A method of positioning a trailer hitch alignment device for aligning hitching components used in coupling a trailer to a towing vehicle, said hitching components comprising a ball associated with said towing vehicle and a coupling unit associated with said trailer, said method comprising the steps of:
(a) positioning a first target substantially over said ball associated with said towing vehicle; and
(b) positioning first and second light sources on said towing vehicle such that said first light source emits a first light beam having at least one ray intersecting said first target and said second light source emits a second light beam having at least one ray that intersects said first target.

34. The method of claim 33, further comprising positioning the first target substantially at the vertical axis of said ball.

35. The method of claim 33, further comprising the steps of:
(c) removing said first target from said towing vehicle;
(d) placing said first target substantially over said coupling unit associated with said trailer;
(e) moving said towing vehicle toward said trailer such that said first light beam comprises at least one ray that intersects said first target;
(f) moving said towing vehicle toward said trailer such that said second light beam moves toward said first target; and
(g) stopping said movement of said towing vehicle when said second light beam substantially intersects said first target.

36. The method of claim 35, wherein step (d) comprises positioning said first target substantially at the vertical axis of said coupling unit.

37. The method of claim 33, further comprising the steps of:
- (c) placing a second target substantially at the vertical axis of said coupling unit;
- (d) moving said towing vehicle toward said trailer until said first light beam intersects said second target;
- (e) moving said towing vehicle toward said trailer such that said second light beam moves toward said second target; and
- (f) stopping said movement when said second light beam substantially intersects said second target.

38. The method of claim 33, wherein said first target is vertically extending.

39. A method of positioning a first object substantially in alignment with a second object comprising the steps of:
- (a) placing first and second light sources on the first object;
- (b) positioning said first object such that a light beam from said first light source substantially intersects a vertically oriented target movable with said second object;
- (c) moving said first object toward said second object such that said light beam from said first light source remains on said vertically oriented target; and
- (d) stopping movement of said first object toward said second object when a light beam from said second light source substantially intersects said vertically oriented target, at which point said first and second objects are substantially aligned.

40. The method of claim 39, further comprising connecting said first object to said second object.

41. The method of claim 40, wherein said first object is a towing vehicle and said second object is a trailer.

42. The method of claim 41, wherein said towing vehicle is connected to said trailer by hitching components comprising a ball and coupling unit.

43. The method of claim 39, wherein step (a) further comprises positioning said first light source on said first object such that a light beam from said first light source lies in a plane parallel to the longitudinal axis of said first object.

44. The method of claim 39, wherein during step (c) said light beam from said first light source moves vertically along the vertical axis of said target.

45. An object alignment device, comprising:
- a first light source movable with a first object, said first light source capable of emitting a first light beam toward a target associated with a second object;
- a second light source movable with said first object, said second light source capable of emitting a second light beam toward said target; and
- wherein said first light source and second light source are positioned such that, when said first light beam intersects said target, and said first object is moved toward said second object while maintaining said first light beam on said target, said first object will be substantially aligned with said second object when said second light beam intersects said target.

46. The object alignment device of claim 45, wherein said first object is a towing vehicle and said second object is a trailer, and wherein when said towing vehicle moves towards said trailer while said first light beam is maintained on said target, a ball on said towing vehicle will be aligned for connection to a coupling unit on said trailer when said second light beam intersects the target.

47. A trailer hitch alignment device for aligning hitching components used in coupling a trailer to a towing vehicle, comprising:
- a first light source movable with said towing vehicle, said first light source capable of emitting a first light beam toward a target associated with said trailer;
- a second light source movable with a towing vehicle, said second light source capable of emitting a second light beam toward said target; and
- wherein said first light source and second light source are positioned such that when the first light beam is directed toward said target and said towing vehicle moves toward the target with the first light beam being maintained on the target, the second light will intersect the target to indicate to a driver of the towing vehicle that the hitching components are substantially aligned for coupling said trailer to said towing vehicle.

48. The trailer hitch alignment device of claim 47, wherein said first light source is positioned on said towing vehicle such that said first light beam is substantially parallel to a longitudinal axis of said towing vehicle.

49. A method of positioning a ball on a towing vehicle substantially in alignment with a coupling unit on trailer for connection to the towing vehicle comprising the steps of:
- (a) placing first and second light sources on the towing vehicle;
- (b) positioning the towing vehicle such that a light beam from the first light source substantially intersects a vertically oriented target movable with the trailer;
- (c) moving the towing vehicle toward the trailer;
- (d) maintaining the first light beam on the target as the towing vehicle moves toward the trailer; and
- (e) stopping movement of the towing vehicle when a light beam from the second light source substantially intersects the vertically oriented target to indicate to a driver of the towing vehicle that the ball and coupling unit are in alignment for connection.

50. The method of claim 49, wherein step (a) further comprises positioning the first light source on the towing vehicle such that a light beam from the first light source lies in a plane parallel to the longitudinal axis of the towing vehicle.

51. The method of claim 49, wherein during step (c) the light beam from the first light source moves vertically along the vertical axis of the target.

* * * * *